Jan. 18, 1966 W. J. REYNOLDS 3,229,803
PRODUCT FEEDER WITH TRANSFER TUBES
Filed May 18, 1964 3 Sheets-Sheet 1
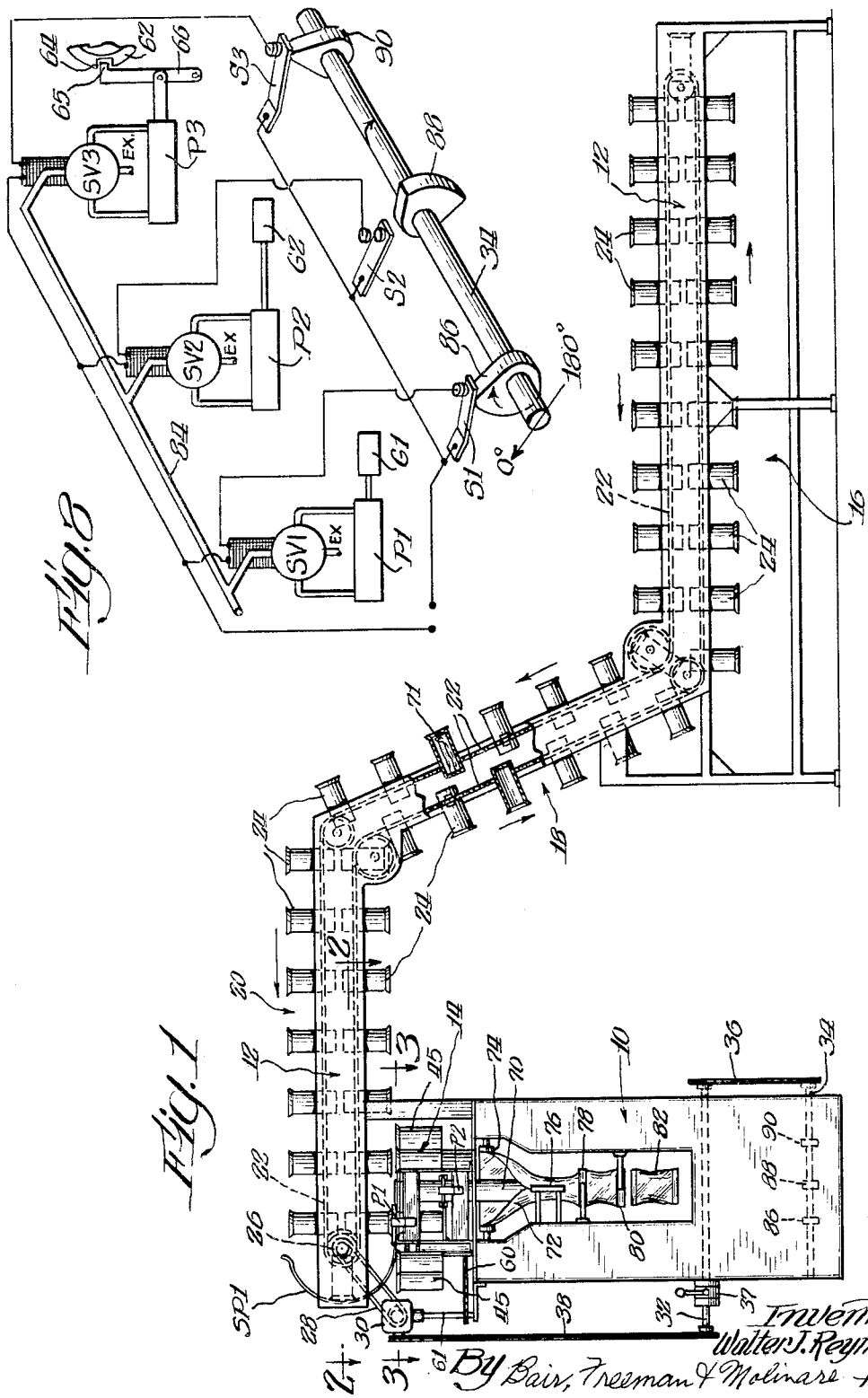
Inventor:
Walter J. Reynolds
By Bair, Freeman & Molinare Attys

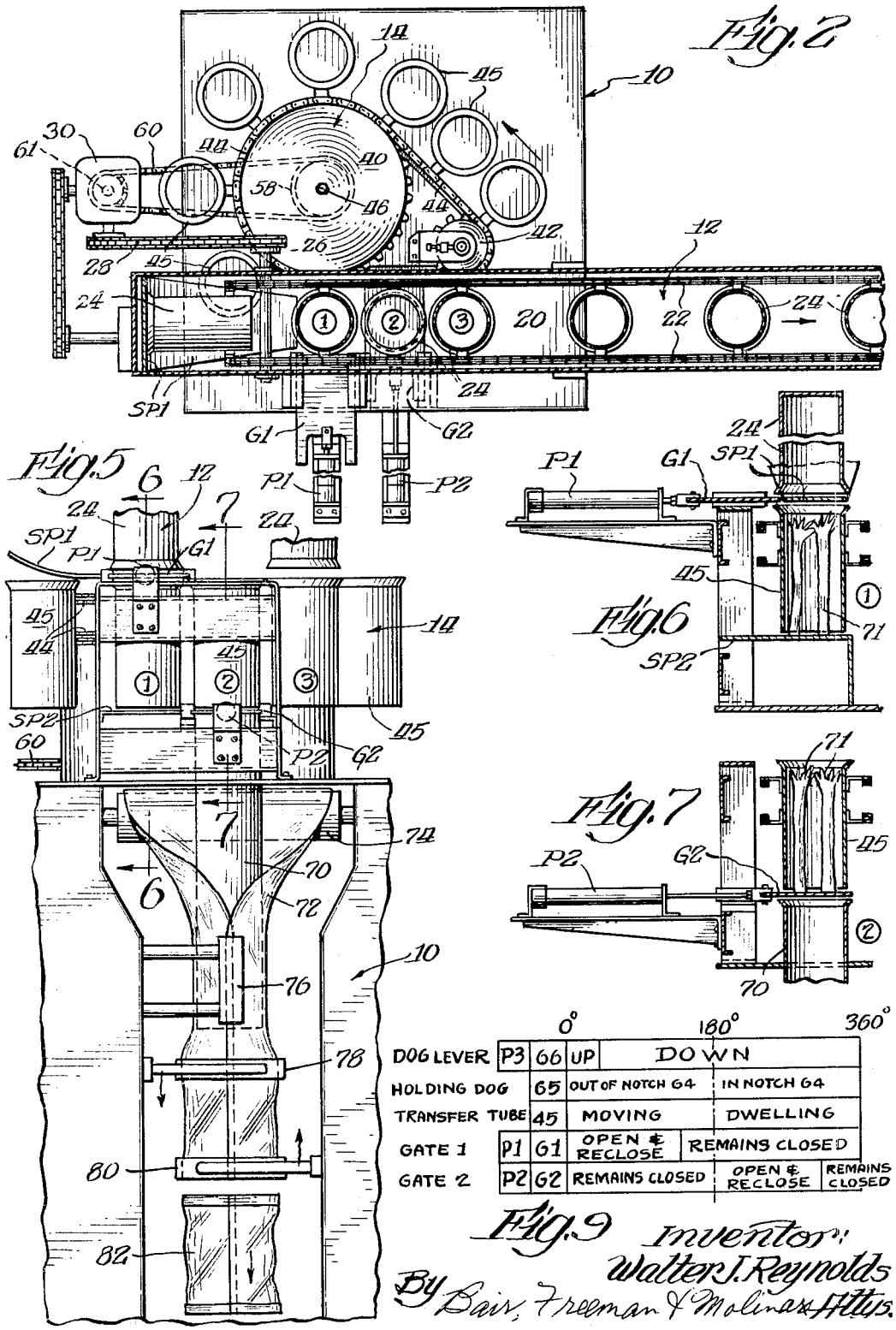

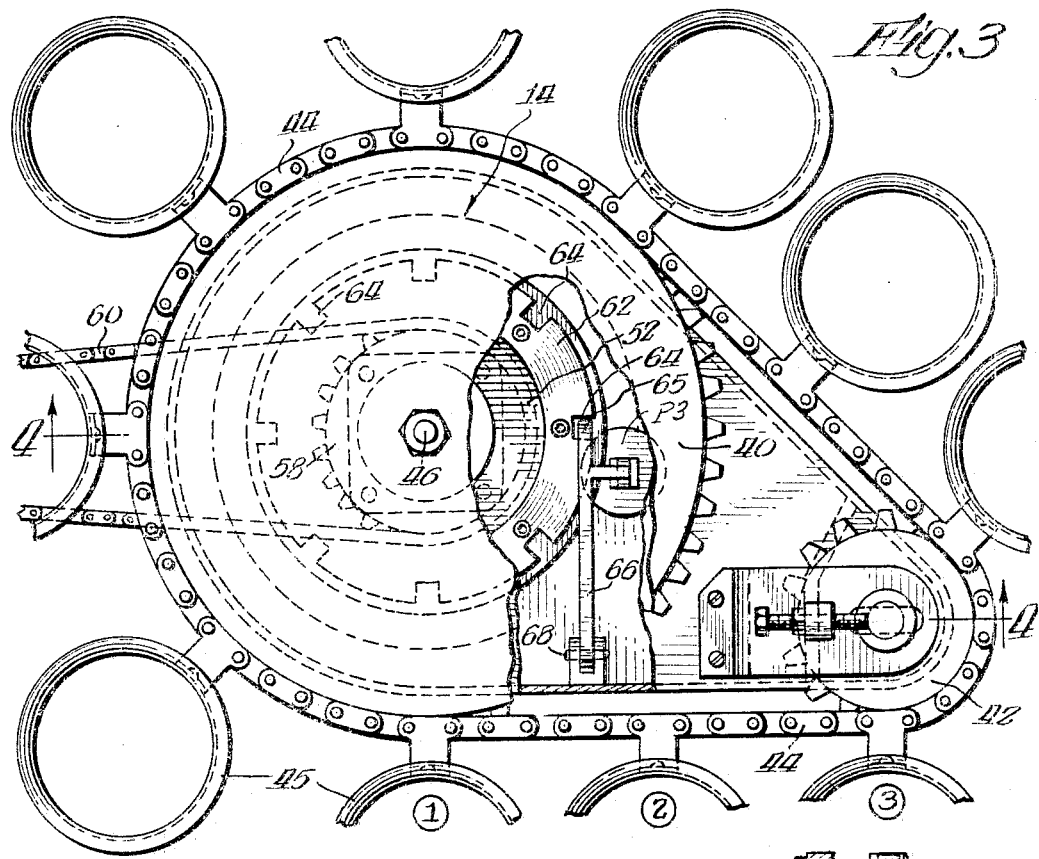
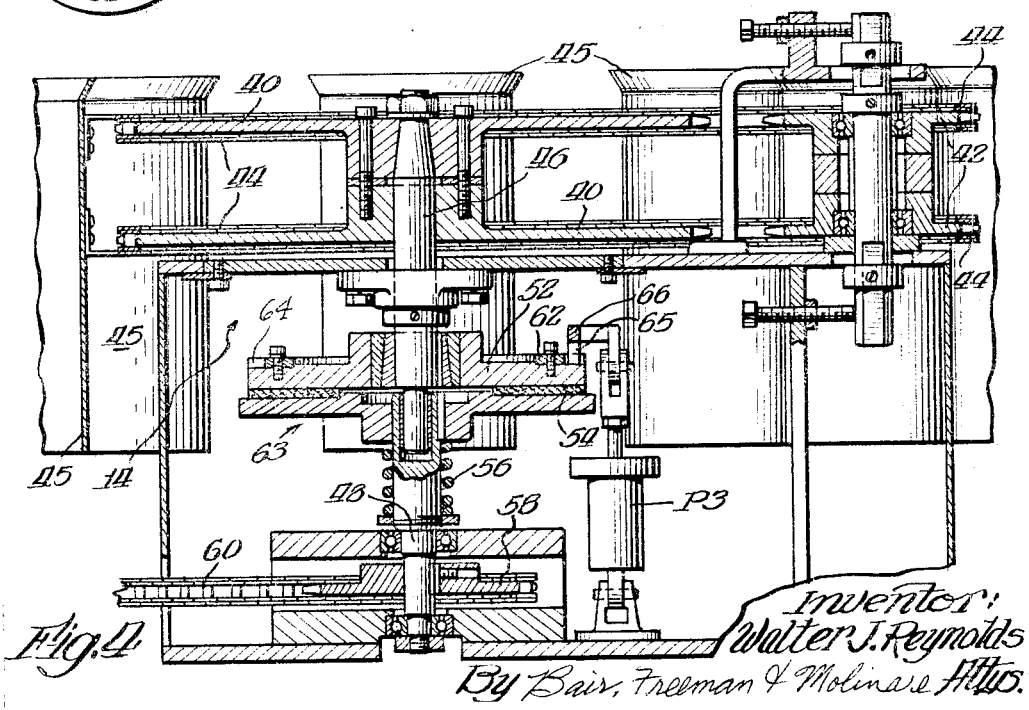

United States Patent Office 3,229,803
Patented Jan. 18, 1966

3,229,803
PRODUCT FEEDER WITH TRANSFER TUBES
Walter J. Reynolds, Garden City, Mich., assignor to Lynch Corporation, Anderson, Ind., a corporation of Indiana
Filed May 18, 1964, Ser. No. 368,012
14 Claims. (Cl. 198—26)

This invention relates to a product feeder having spaced tubular product receivers adapted to receive product such as celery, carrots, and the like, and deliver the same to means for enclosing the product.

One object of the invention is to provide a product feeder which includes a continuously movable product conveyor having spaced can-like product receivers adapted to receive increments of product placed therein either by hand or automatically.

Another object is to provide the conveyor so arranged that it can be loaded at a convenient level and will then elevate the increments of product to a position from which they may drop by gravity into means for enclosing the product.

Still another object is to provide a means for transferring the increments of product from the product conveyor to the means for enclosing the product in the form of transfer tubes and withdrawable gates arranged so as to receive product from the continuously movable product conveyor and intermittently discharge the product into the means for enclosing the same which also operates intermittently.

A further object is to provide means for intermittently moving the transfer tubes in a path between the product receiver and the means for enclosing the product so that successive transfer tubes move in alignment with successive product receivers for receiving increments of product therefrom, and an arrangement of platforms and gates is provided permitting transfer of the increments of product from the product receivers to the transfer tubes during simultaneous motion thereof, and transfer of the increments of product from the transfer tubes to the means for enclosing the product while the transfer tubes are stationary.

Still a further object is to provide a novel type of clutch for intermittent movement of the transfer tubes.

An additional object is to provide pneumatic means for operating the clutch and gates of the transfer mechanism.

With these and other objects in view, my invention consists in the construction, arrangement and combination of the various parts of my product feeder, whereby the objects above contemplated are attained, as hereinafter more fully set forth, pointed out in my claims and illustrated in detail on the accompanying drawings, wherein:

FIG. 1 is a somewhat diagrammatic front elevation of a product feeder embodying my present invention and showing the same attached to a bagging machine;

FIG. 2 is an enlarged plan view of the mechanism at the left-hand end of FIG. 1 and is taken partly in section on the line 2—2 thereof;

FIG. 3 is a further enlarged plan view of a portion thereof to show details of an intermittent drive mechanism;

FIG. 4 is a front elevation of the intermittent drive mechanism for the transfer tubes of my product feeder;

FIG. 5 is a further enlarged view of a portion of FIG. 1 to show transfer and bagging mechanisms in greater detail;

FIGS. 6 and 7 are vertical sectional views on the lines 6—6 and 7—7 of FIG. 5 to show different operating positions of parts;

FIG. 8 is an electro-pneumatic diagram of the automatic operating means for the apparatus; and FIG. 9 is a cycle diagram for the parts of the apparatus.

On the accompanying drawings I have used the reference numeral 10 to indicate in general an upright-type of bagging machine which constitutes a means for enclosing product, 12 a product conveyor for delivering increments of product thereto and 14 a product transfer unit.

The product conveyor 12 has a horizontal loading portion 16, an elevating portion 18 and an upper horizontal portion 20. The conveyor includes a chain 22 (which is trained around suitable sprockets as illustrated in FIG. 1) and a plurality of spaced can-like product receivers 24 carried thereby as illustrated in FIG. 1. The receivers 24, as they travel along the upper stretch of the chain 22 in the loading portion 16 of the product conveyor, are adapted to receive increments of product such as bunches of carrots or celery which may be placed therein manually or by suitable automatic means if desired.

The elevating portion 18 elevates the product to the upper horizontal portion 20 of the product conveyor from which latter portion the product is transferred into the product transfer unit 14 which, in turn, delivers the increments of product to the bagging machine 10 which is cyclically operable. It has a main shaft 34 which rotates once each cycle of operation, and the conveyor chain 22 is operated therefrom and synchronized in relation thereto so that the product receivers 24 successively pass a given point once each cycle of operation of the bagging machine.

The drive between the main shaft 34 and the conveyor chain 22 comprises a sprocket 26 at the upper end of the conveyor connected by a chain 28 to gearing within a suitable gear box 30 which, in turn, is connected by a chain 38 to a countershaft 32. The countershaft 32 is driven by a chain 36 from the main shaft 34 and has a clutch 37 for throwing the product conveyor 12 into or out of operation as desired independent of the operation of the bagging machine.

The product transfer unit 14 comprises a pair of large sprockets 40 as shown in FIGS. 2, 3 and 4, a pair of small idler sprockets 42 having chains 44 trained therearound, the chains carrying transfer tubes 45, and associated mechanism for driving the chains 44 and controlling the product received from the product receivers 24 and delivered to the bagging machine 10. A pair of vertical shafts 46 and 48 (FIG. 4) are arranged in alignment with each other and suitably journaled in the product transfer unit 14. The shaft 46 drives the sprockets 40 whereas the shaft 48 has a sprocket 58 thereon driven by a chain 60 from a depending shaft 61 of the gear box 30 as shown in FIG. 1.

A clutch 63 (see FIGS. 3 and 4) is provided in the form of a continuously rotating driving clutch disc 50 on the shaft 48 and a driven clutch disc 52 on the shaft 46, a wear-resistant friction washer 54 being provided between the two and the friction maintained by a clutch spring 56. The disc 50 is slidable on the shaft 48 to permit the spring 56 to function but is non-rotatable on the shaft. A notched ring 62 of hardened steel is secured to the driven clutch disc 52 and is provided with notches 64 as shown in FIG. 3, one for each transfer tube 45 around the periphery of the sprockets 40 into which a holding dog 65 is adapted to snugly interfit. The holding dog 65 is mounted on a clutch lever 66 pivoted at 68 which is adapted to be raised and lowered by a pneumatic actuator P3. When the holding dog is in the notch it holds the driven clutch disc 52 against rotation even though the clutch disc 50 is rotating, the friction washer 54 permitting relative slippage of 50 relative to 52. When ever the clutch lever 66 is raised by the pneumatic actuator P3 the disc 52 is released so as to rotate with the disc 50 and immediately after such raising the lever 66 is again lowered so that the holding dog 65 rides the top of the ring 62 between the notches 64 and drops into the next notch as soon as it coincides with the holding dog. Thus, intermittent operation of the transfer tubes 45 is derived from continuous rotation of the sprocket 58.

As shown in FIG. 1 the transfer tubes 45 are spaced half the distance apart of the product receivers 24. The product receivers travel continuously whereas the transfer tubes travel intermittently but at the same speed as the product receivers. Accordingly, the travel time of the transfer tube is one-half the total cycle and the dwell time is the other half thereof.

It is obvious that when the product receivers 24 turn over at the upper left end of the product conveyor 12, they would spill their contents. To prevent this, an arcuate stationary plate SP1 is shown in FIG. 1 to serve as a bottom member for the product receivers. Three stations are shown 1, 2 and 3. The plate SP1 terminates adjacent station 1. At this station a gate G1 in the form of a slide plate is located between a product receiver 24 and a transfer tube 45 when at this station as in FIG. 6. Below the transfer tube a second stationary plate or bottom member SP2 is provided which extends to a position adjacent station 2. At station 2 a gate G2 is provided below the transfer tube. Also at this station a receiving tube 70 of the bagging machine is located around which the bag is formed of suitable plastic material or cellophane 72, the same being supplied from a roll 74 thereof as shown in FIG. 5. The bagging machine is provided with the usual sealing means 76 for the seam of the bag, and combination seal and "hand-over-hand" draw arms 78 and 80 below the lower end of the receiving tube 70 for sealing the tops and bottoms of the bags and cutting them off and discharging them as at 82 in a manner which forms no part of my present invention and is of the general type shown in Frank Patent No. 3,015,922. The mechanism is shown somewhat vertically foreshortened to conserve space on the drawing whereas the length of the bag 82 is greater than the length of the product.

For operating the gates G1 and G2, pneumatic actuators P1 and P2 are provided. Referring to FIG. 8 the pneumatic actuators P1, P2 and P3 are controlled by solenoid valves SV1, SV2 and SV3 having circuits which are controlled by normally open switches S1, S2 and S3, respectively. The compressed air supply for the pneumatic actuators is shown at 84. The switches S1, S2 and S3 are controlled by cams 86, 88 and 90 which are cyclically operable to close the switches as by being located on or driven by the main shaft 34.

Referring to FIG. 9 a timing or cycle diagram is shown. The portion of a cycle during which the pneumatic actuator P3 is up or down, the corresponding time that the holding dog 65 is out of the notch 64 and in the notch, the corresponding time that the transfer tubes are moving and dwelling are indicated. Also shown is the time that the pneumatic actuators P1 and P2 are operable to open and reclose the gates G1 and G2.

*Practical operation*

In the operation of my product feeder, when the bagging machine 10 is in operation and the clutch 37 is manually moved to the operative position, the product receivers 24 will be operable to deliver increments of product to the bagging machine through the transfer tubes 45, the operator placing the increments of product in the receivers while they travel along the conveyor portion 16. Because of continuous travel it is relatively easy to load the receivers with product.

When the product receiver traverses the plate SP1, the product will, by gravity, contact this plate and be slid therealong by the moving product receiver. The product will be slid off the plate SP1 and onto the gate G1 at station 1, and the pneumatic actuator P1 is timed to withdraw the gate G1 at about the same time that a product receiver and a transfer tube reach station 1. Accordingly, the product (such as celery 71) is transferred by gravity (FIG. 6) from the product receiver to the transfer tube and both travel at the same speed until station 2 is reached whereupon the transfer tube is stopped but the product receiver continues on to station 3. During the movement of the transfer tube from station 1 to station 2 it slides the product along on the plate SP2 and onto the gate G2 (FIG. 7). About the time the transfer tube reaches station 2 the gate G2 is withdrawn to permit the product to fall by gravity into the receiving tube 70 and into the bag being formed at this time. At the same time the bag is being moved downwardly by one or the other set of sealing and draw arms 78 or 80 and is finally cut off and discharges as at 82.

By the time one product receiver 24 reaches station 3 the following one reaches station 1 and the operating cycle just described is repeated.

From the foregoing specification it will be obvious that I have provided a product feeder which includes transfer means for product in continuous motion, which transfer means converts the continuous motion to intermittent motion and delivers the product down a stationary tube 70 of the bagging machine during the stopped period of the transfer tube 45. By indexing the transfer tubes one-half the time and spacing them one-half the spacing of the product receivers, this type of operation is made possible.

This type of apparatus makes possible a high bagging rate such as 60 bags per minute for carrots, celery or the like. The mechanism is comparatively simple, and a simple but accurate indexing procedure is provided for the transfer tubes.

Some changes may be made in the construction and arrangement of the parts of my product feeder without departing from the real spirit and purpose of my invention, and it is my intention to cover by my claims any modified forms of structures or use of mechanical equivalents which may reasonably be included within their scope.

I claim as my invention:

1. In a product feeder of the character disclosed, a frame having first and second stations, a movable produce conveyor having spaced can-like product receivers adapted to pass said stations and deliver increments of product to means at said second station for enclosing the product, said means being cyclically operable and thereby adapted to receive said increments of product intermittently, and means for transferring said increments of product from said product receivers to said product enclosing means comprising transfer tubes, means for moving said transfer tubes along a path between said product receivers and said means for enclosing product so that successive transfer tubes move in alignment with successive product receivers for receiving increments of product therefrom, a stationary bottom member for said product receivers along which the increments of product are slid by the movement of said product receivers, a first gate beyond the terminal end of said stationary bottom member and at said first station onto which the increments of product are slid by said product receivers, a second stationary bottom member below said transfer tubes at said first station, extending to said second station and along which the increments of product are slid by said transfer tubes while they are aligned and move with said product receivers between said first station and said second station, a second gate at said second station between a transfer tube when stationary thereat and said product enclosing means, and means for withdrawing said first gate during the simultaneous movement of said product receiver and said transfer tube and for withdrawing said second gate when said transfer tube is stationary at said second station.

2. A product feeder in accordance with claim 1 wherein said product conveyor has a loading section at loading level, an elevating section and a discharging section at an elevated position above said transfer tubes.

3. A product feeder in accordance with claim 1 wherein said means for intermittently moving said transfer tubes comprises a friction clutch and notch-and-dog means to stall said clutch during one-half cycle and permit its operation during the next half cycle.

4. A product feeder in accordance with claim 2 wherein said means for intermittently moving said transfer tubes comprises a friction clutch and notch-and-dog means to stall said clutch during one-half cycle and permit its operation during the next half cycle.

5. A product feeder in accordance with claim 1 wherein said product conveyor and said transferring means are timed in accordance with the operations of said product enclosing means.

6. A product feeder in accordance with claim 5 wherein said gates are also timed in accordance with the operations of said product enclosing means.

7. A product feeder in accordance with claim 1 wherein said gates are provided with pneumatic actuators which are timed in accordance with the operations of said product enclosing means.

8. A product feeder in accordance with claim 1 wherein said gates are provided with pneumatic actuators, solenoid valves are provided to control said pneumatic actuators and switches are provided for said solenoid valves, said switches being timed in accordance with the operations of said product enclosing means.

9. A product feeder in accordance with claim 8 wherein said means for intermittently moving said transfer tubes comprises a friction clutch and notch-and-dog means to stall said clutch during one-half cycle and permit its operation during the next half cycle, a pneumatic actuator for said notch-and-dog means, a solenoid valve for controlling said last pneumatic actuator and a switch for said last solenoid valves, said last switch being timed in accordance with the operations of said product enclosing means.

10. In a product feeder of the character disclosed, a frame having first and second stations, a movable product conveyor having spaced tubular product receivers adapted to pass said stations and deliver increments of product to means at said second station for enclosing the product, and means for transferring said increments of product from said product receivers to said product enclosing means comprising transfer tubes, means for moving said transfer tubes along a path between said product receivers and said means for enclosing product so that successive transfer tubes move in alignment with successive product receivers for receiving increments of product therefrom, a stationary bottom member for said product receivers along which the increments of product are slid by the movement of said product receivers, a first gate beyond the terminal end of said stationary bottom member and at said first station onto which the increments of product are slid by said product receivers, a second stationary bottom member below said transfer tubes at said first station, extending to said second station and along which the increments of product are slid by said transfer tubes between said first station and said second station, a second gate at said second station between a transfer tube thereat and said product enclosing means, and means for withdrawing said first gate when a transfer tube is aligned with a product receiver and for withdrawing said second gate when said transfer tube is at said second station.

11. A product feeder in accordance with claim 10 wherein said product conveyor is continuously movable and said transfer tubes are intermittently movable.

12. A product feeder in accordance with claim 11 wherein the means for intermittently moving said transfer tubes comprises a friction clutch and notch-and-dog means to stall said clutch during one-half cycle and permit its operation during the next half cycle.

13. A product feeder in accordance with claim 12 wherein said product conveyor and said transferring means are timed in accordance with the operations of said product enclosing means.

14. A product feeder in accordance with claim 13 wherein said gates are also timed in accordance with the operations of said product enclosing means.

References Cited by the Examiner
UNITED STATES PATENTS

| | | | |
|---|---|---|---|
| 2,378,579 | 6/1945 | Popov | 198—26 |
| 2,455,433 | 12/1948 | Matsen et al. | 198—26 X |
| 2,935,930 | 5/1960 | Abrams | 198—143 X |
| 3,059,752 | 10/1962 | Peazze | 198—26 |

SAMUEL F. COLEMAN, *Primary Examiner.*